US009625785B1

(12) United States Patent
Zortman et al.

(10) Patent No.: US 9,625,785 B1
(45) Date of Patent: Apr. 18, 2017

(54) RECONFIGURABLE OPTICAL-TO-OPTICAL FREQUENCY CONVERSION METHOD AND APPARATUS

(71) Applicant: Sandia Corporation, Albuquerque, NM (US)

(72) Inventors: William A. Zortman, Corrales, NM (US); Anthony L. Lentine, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 98 days.

(21) Appl. No.: 14/563,860

(22) Filed: Dec. 8, 2014

(51) Int. Cl.
*G02B 6/35* (2006.01)
*G02F 1/313* (2006.01)
*G02B 6/42* (2006.01)
*G02B 6/43* (2006.01)

(52) U.S. Cl.
CPC ......... *G02F 1/3136* (2013.01); *G02B 6/356* (2013.01); *G02B 6/3598* (2013.01); *G02B 6/4274* (2013.01); *G02B 6/4291* (2013.01); *G02B 6/43* (2013.01); *G02F 1/3132* (2013.01)

(58) Field of Classification Search
USPC .......................................... 385/9, 10–14, 16
See application file for complete search history.

(56) References Cited

U.S. PATENT DOCUMENTS

| | | | | |
|---|---|---|---|---|
| 4,004,078 A * | 1/1977 | Gorog | ................. | H04B 10/00 348/473 |
| 6,195,187 B1 * | 2/2001 | Soref | ................. | G02B 6/12007 398/9 |
| 6,661,950 B1 * | 12/2003 | Strecker | ............ | G02B 6/12007 385/14 |
| 6,717,972 B2 * | 4/2004 | Steinle | .................... | H01S 5/183 372/50.1 |
| 7,480,425 B2 * | 1/2009 | Gunn | ................. | G02B 6/12007 385/14 |

(Continued)

OTHER PUBLICATIONS

Cox, J.A. et al., "Control of integrated micro-resonator wavelength via balanced homodyne locking," Optics Express 22 (2014) pp. 11279-11289.

(Continued)

*Primary Examiner* — Akm Enayet Ullah
(74) *Attorney, Agent, or Firm* — Martin I. Finston

(57) ABSTRACT

A photonic device is provided for impressing a modulation pattern on an optical carrier. The device includes a unit in which a photodetector and an optical microresonator are monolithically integrated. The device further includes an optical waveguide evanescently coupled to the optical microresonator and having at least an upstream portion configured to carry at least one optical carrier toward the microresonator. The optical microresonator is tunable so as to resonate with the optical carrier frequency. The optical microresonator and the photodetector are mutually coupled such that in operation, charge carriers photogenerated in the photodetector are injected into the microresonator, where the photocurrent changes the resonant conditions. In some embodiments the device is operable as an optical-to-optical frequency converter. In other embodiments the device is operable as an oscillator.

15 Claims, 4 Drawing Sheets

(56) References Cited

U.S. PATENT DOCUMENTS

| | | | | |
|---|---|---|---|---|
| 7,486,855 | B2* | 2/2009 | Smith | G01N 21/7746 385/30 |
| 8,582,929 | B2* | 11/2013 | Yi | G02F 1/2257 385/10 |
| 9,134,169 | B2* | 9/2015 | Li | G01J 1/0209 |
| 2003/0202548 | A1* | 10/2003 | Andersen | H01S 5/0687 372/20 |
| 2004/0150043 | A1* | 8/2004 | Holm | H01L 27/0605 257/347 |
| 2006/0098695 | A1* | 5/2006 | Mitrofanov | G01R 15/241 372/12 |
| 2009/0208209 | A1* | 8/2009 | Ng | G02B 6/12007 398/49 |
| 2010/0098372 | A1* | 4/2010 | Manipatruni | G02B 6/12007 385/2 |
| 2010/0238454 | A1* | 9/2010 | Pruessner | G01G 3/165 356/479 |
| 2011/0277540 | A1* | 11/2011 | Ioppolo | G01R 29/0885 73/31.03 |
| 2015/0185422 | A1* | 7/2015 | Chan | G02B 6/3596 385/17 |

OTHER PUBLICATIONS

De Rose et al., "Ultra compact 45 GHz CMOS compatible Germanium waveguide photodiode with low dark current," Opt. Express 19 (2011) pp. 24897-24904.
Watts et al., "Ultralow Power Silicon Modulators," Advanced Photonics for Communications, OSA Technical Digest (online) (Optical Society of America, 2014), paper JT2B.2, pp. 1-2.
Zortman et al., "Bit-Error-Rate Monitoring for Active Wavelength Control of Resonant Modulators," IEEE Micro 33 (Jan. 2013) pp. 42-52.

* cited by examiner

RECONFIGURABLE OPTICAL-TO-OPTICAL FREQUENCY CONVERSION METHOD AND APPARATUS

STATEMENT OF GOVERNMENT INTEREST

This invention was developed under Contract DE-AC04-94AL85000 between Sandia Corporation and the U.S. Department of Energy. The U.S. Government has certain rights in this invention.

FIELD OF THE INVENTION

The invention relates to optoelectronic devices and more particularly to frequency-selective devices that incorporate optical microresonators.

ART BACKGROUND

Frequency conversion has many uses in optical communication. For example, data can be distributed more efficiently over network channels when reconfigurable optical add-drop multiplexers or similar frequency-converting devices are included in communication links. Likewise, data can be routed more efficiently when network switching hardware is capable of frequency conversion.

Technical approaches to frequency conversion have been implemented in various materials systems. In silicon photonics, for example, direct optical-to-optical frequency conversion has been demonstrated using non-linear processes in silicon. In general, however, such processes are stimulated only with high-power optical input which places them out of reach for at least some applications.

Conversion between optical frequency channels can also be performed in the electronic domain by receiving on a first frequency and retransmitting on a second frequency that may be different from the first. So called optical-electrical-optical (OEO) conversion is known to be a practical solution that can handle high traffic loads and at least moderately high data rates.

However, the conversion to and from the electronic domain limits the ultimately achievable performance by adding latency. OEO conversion also adds hardware and power-consumption overhead.

Hence there remains a need for new approaches to frequency conversion that reduce or eliminate at least some of the disadvantages listed above.

SUMMARY OF THE INVENTION

We have developed a new direct optical-to-optical frequency converter that can be implemented in silicon photonics technology. Our frequency converter combines aspects of a photodetector with aspects of an optical microresonator modulator. In implementations to be described below, a single detector and a single modulator are provided for each reconfigurable channel. In other implementations, however, plural detectors operate redundantly in parallel waveguides on the same channel to increase the drive strength on the modulator.

In operation, an incoming optical signal at a frequency $f_{in}$ causes electron-hole pairs to be photogenerated in a germanium detector. Under the action of an electric field, photogenerated charge carriers are swept into a silicon ring or disk modulator where this photocurrent changes the refractive index of the silicon through the plasma-optic effect.

In the absence of perturbation by the photogenerated electrons, the modulator is thermally tuned to a carrier wave of frequency $f_c$ that propagates in an output waveguide. At resonance, destructive interference prevents any power at the carrier frequency $f_c$ from coupling into, and hence producing output from, the output waveguide. This condition corresponds to an output data value of logical 0. But when photogenerated charge carriers enter the modulator, the plasma-optical index change shifts the modulator away from resonance. Under this condition, interference of the optical carrier wave of frequency $f_c$ is no longer supported. In the off-resonance condition, therefore, power at the carrier frequency $f_c$ can couple into the output waveguide and thereby produce output that corresponds to a logical 1.

In implementations, a heater for tuning the modulator is integrated into, e.g., the center contact of the modulator. The heater is used for reconfiguration by retuning the modulator to any of various carrier wave frequencies $f_1$-$f_n$. The time needed for thermal switching of this kind in typical silicon microresonator modulators is on the order of a microsecond.

If faster switching is needed, provision can be made for electrical switching, which offers up to gigahertz speeds. In an electrically switchable modulator, the carrier concentration is varied by selecting a new reverse bias point in a modulator with a single PN junction. The resulting variations in carrier concentration shift the resonant frequency of the resonator.

One advantage of our approach is that it can be implemented in an integrated circuit, and in some embodiments in a monolithic structure. Another advantage is that in implementations, the frequency conversion can be carried out with high efficiency. For example, an energy consumption as low as 10 fJ per bit, or even less, is believed achievable. (We note, however, that thermal tuning might require greater power levels, which are dependent on the efficiency of the heater.) Another advantage is that in implementations, frequency swapping can be carried out across the entire optical C and L bands, encompassing the wavelengths from 1530 to 1610 nm. This is important for optical communications because it is the amplification range of C and L band erbium-doped fiber amplifiers. Another advantage is that the electrical signal produced by the germanium photodetector is recoverable and can be put to use in external circuitry.

Certain implementations provide yet a further advantage: Optical feedback between the germanium detector and the microresonator, occurring through evanescent coupling, can cause oscillations in both the optical field in the microresonator and in the electrical response of the detector. Consequently, the device can find practical application as an oscillator having both optical and electrical outputs.

Thus in a broad aspect, an embodiment of the invention is a device for impressing a modulation pattern on an optical carrier. The device includes a unit in which a photodetector and an optical microresonator are monolithically integrated. The device further includes an optical waveguide evanescently coupled to the optical microresonator and having at least an upstream portion configured to carry at least one optical carrier toward the microresonator. The optical microresonator is tunable so as to resonate with the optical carrier frequency. The optical microresonator and the photodetector are mutually coupled such that in operation, charge carriers photogenerated in the photodetector are injected into the microresonator.

In embodiments for use, e.g., as an optical cross-connect, the said optical waveguide is an output waveguide, the photodetector is excited by light carried in on a further, input waveguide, and the modulated carrier exits on the output waveguide.

In embodiments for use as an oscillator, for example, the photodetector is excited by evanescent coupling to the optical mode field in the microresonator. The modulated carrier exits on the same waveguide on which it entered, or on a second, output waveguide.

In another aspect, an embodiment of the invention is an apparatus comprising a silicon microresonator fabricated continuously with a silicon pedestal, a germanium photodetector electrically coupled to the microresonator through the pedestal, and an output optical waveguide evanescently coupled to the microresonator.

In embodiments, the apparatus further includes a tuning element fabricated within the microresonator and configured to tune the resonator to selectable optical frequencies. In some embodiments, the tuning element is an electric heater. In other embodiments, the tuning element is a pn junction.

In embodiments, the apparatus further includes an input waveguide optically coupled to the detector. In some embodiments, the optical coupling between the input waveguide and the detector is effectuated by a frequency-selective element such as a drop filter. In some embodiments, the frequency-selective element is tunable.

In embodiments, the germanium photodetector is optically coupled to the microresonator via its physical proximity across the pedestal.

In embodiments, the germanium photodetector is electrically coupled to the microresonator through the pedestal.

An embodiment of the invention according to a third aspect is a system comprising a plurality of germanium photodetectors optically coupled to an input waveguide and a plurality of silicon microresonators optically coupled to an output waveguide.

Each photodetector is optically coupled to the input waveguide through a respective, tunable, drop filter. By "drop filter" in this regard is meant any device that wholly or partially taps off one or more designated optical channels from a cumulative multichannel optical signal propagating in a waveguide.

Each microresonator is optically coupled to the output waveguide such that at resonance, it can add optical power to, or subtract optical power from, the output waveguide at the resonant frequency. Each microresonator is electrically coupled to a respective photodetector or photodetector group such that electrical output from the coupled photodetector or photodetectors can shift the tuning of the microresonator.

In embodiments, the system further comprises a control circuit for tuning the drop filters and a control circuit for tuning the microresonators.

In embodiments, the system further comprises a multiplexer arranged to combine modulated signals belonging to a plurality of optical channels into the input waveguide upstream of the drop filters. In some embodiments, the system further comprises a multiplexer arranged to combine optical carriers belonging to a plurality of optical channels into the output waveguide upstream of the microresonators.

DETAILED DESCRIPTION

Figure 1:
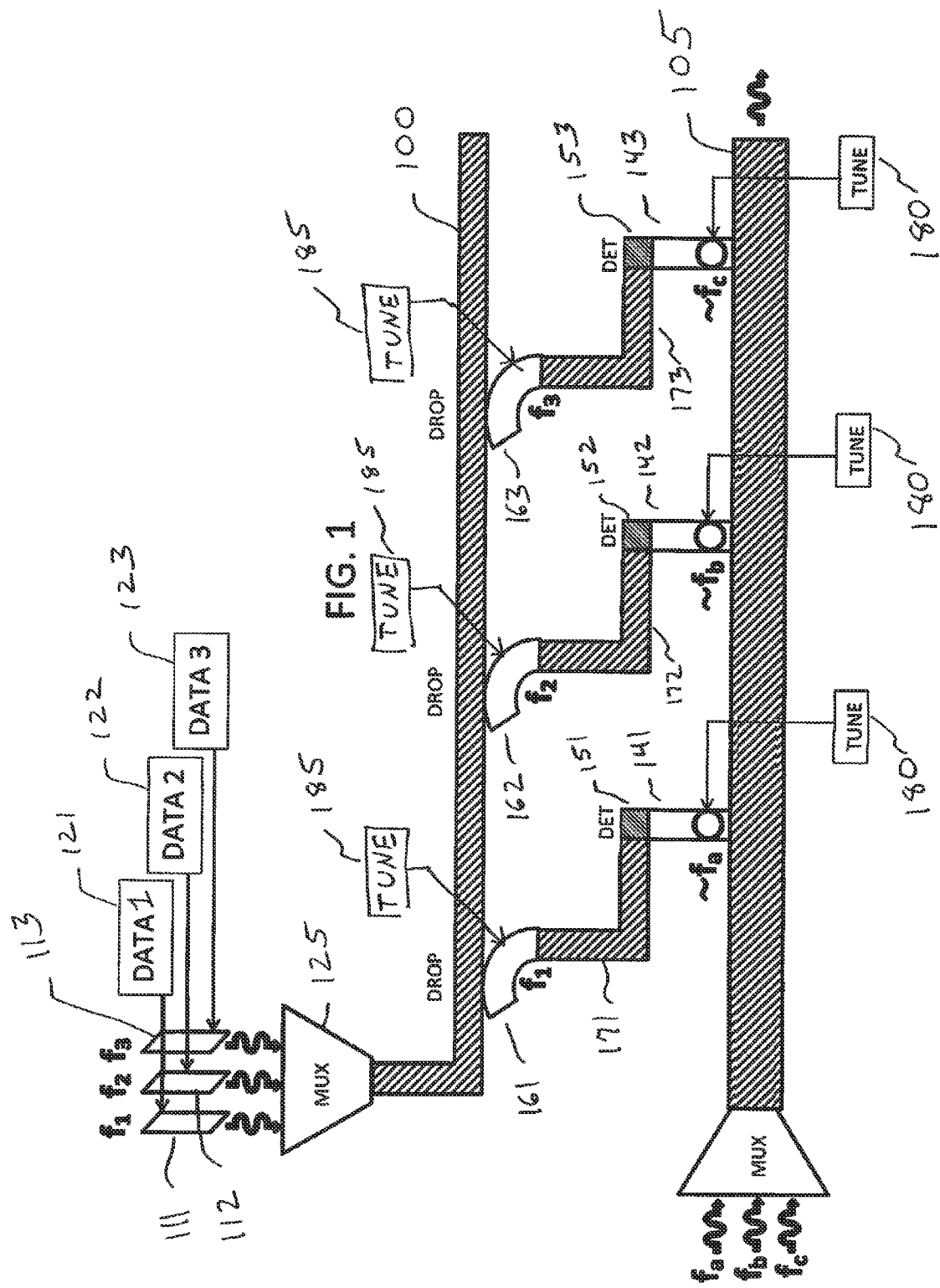
FIG. 1 is a schematic drawing of a system, according to an embodiment of the present invention, for transferring a modulated optical signal from one optical frequency channel to another.

FIG. 1 shows an optical cross-connection system in which data is transferred from optical signals propagating in input waveguide 100 to optical carriers propagating in output waveguide 105. As shown in the figure, optical sources 111, 112, and 113 emit light in respective frequency channels $f_1$, $f_2$, and $f_3$, which are modulated by respective data sources 121 (DATA 1), 122 (DATA 2) and 123 (DATA 3). Wavelength multiplexer 125 combines the three transmissions onto input waveguide 100. In practice, any number of input frequency channels could be used. The choice to show three channels was made solely to simplify the presentation.

Also shown in FIG. 1 is wavelength multiplexer 135, which combines three optical carriers in respective frequency channels $f_a$, $f_b$, and $f_c$ onto output waveguide 105. In practice, any number of output frequency channels could be used. The choice to show three channels was made solely to simplify the presentation.

Also shown in FIG. 1 are detector-modulator elements 141, 142, and 143. Each detector-modulator element includes a germanium photodetector integrated with a silicon microresonator modulator. These elements will be described in greater detail below with reference to FIGS. 3 and 4. Each of the microresonator modulators includes a resonator portion, which in general is a microring or a microdisk. Each resonator portion is optically coupled to output waveguide 105 by evanescent coupling in a manner that is well known for microresonator modulators.

Within each detector-modulator element, the microresonator modulator is electrically coupled to a respective germanium photodetector 151, 152, 153. The manner of electrical coupling will be described in greater detail below. A portion of the optical power propagating in input waveguide 100 is coupled into the photodetectors by respective tunable drop filters 161, 162, 163, each of which is connected to its respective photodetector by, e.g., a respective waveguide 171, 172, 173.

Each of the optical microring or microdisk resonators is tunable by using, e.g., an electric heater for thermo-optical tuning Control circuit 180, shown in the figure in three instantiations solely for purposes of illustration, sets the resonant frequency of each resonator to correspond to a respective, desired optical channel. It is advantageous to stabilize the designated resonant frequencies using any of various known feedback mechanisms. To simplify the presentation, feedback stabilization circuits have been omitted from the figure.

Each of the drop filters is also tunable. Control circuit 185, shown in the figure in three instantiations solely for purposes of illustration, sets the drop channel of each of the drop filters.

In one possible mode of operation, the optical resonators collectively block carrier transmission in the output waveguide when there are no incoming signals from the input waveguide. That is, when there is no excitation from its coupled photodetector, each of the optical resonators is resonant with one of the optical carriers injected into the output waveguide 105. However, the resonator is coupled to the output waveguide in such a way that at resonance, it prevents the resonant carrier from propagating further downstream. Thus in the arrangement of FIG. 1, for example, the resonators associated with detector-modulator elements 141-143 collectively stop carriers $f_a$, $f_b$, and $f_c$ from propagating further downstream. This situation is represented symbolically by FIG. 2, where carriers $f_a$, $f_b$, and $f_c$ are shown as the inputs to normally-open switches.

Figure 2:
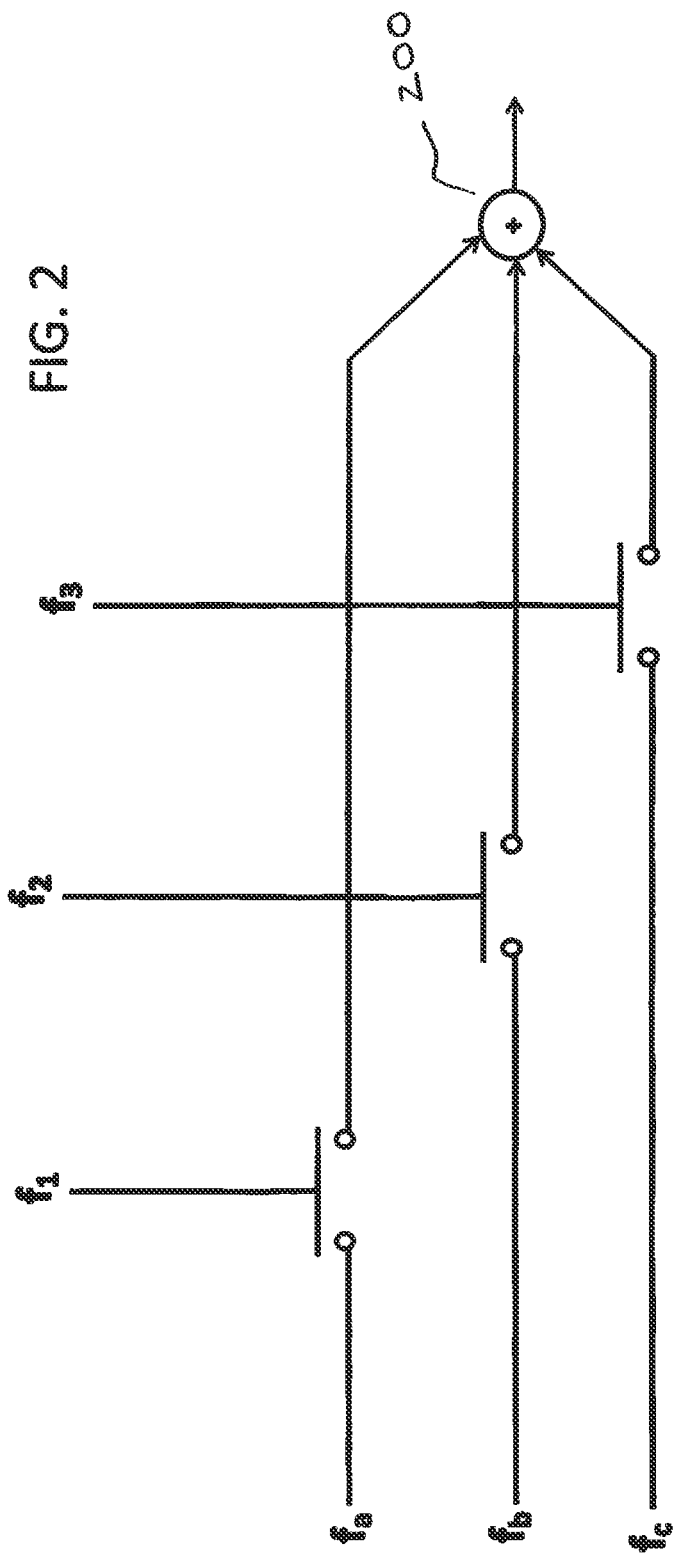
FIG. 2 is a schematic drawing of a switching network that represents one possible mode of operation of the system of FIG. 1.

When a photodetector is excited by optical input, it generates electrical output that shifts its coupled resonator off of resonance. This relaxes the resonant condition that blocked the corresponding carrier, and thus releases the carrier to propagate downstream in the output waveguide. In effect, one of the normally open switches as shown in FIG. 2 is activated so as to place it in the "closed" state. Any number of photodetectors can be excited concurrently. Hence any number of carriers can be concurrently released to propagate downstream in the output waveguide. This is represented symbolically in FIG. 2 by the summation element 200, which adds signals from all activated (hence "closed") switches.

At least two classes of information must be specified in order for the system of FIG. 1 to operate as an optical cross-connect. One class of information defines the set of frequency channels of the incoming modulated signals ("input channels") and the set of frequency channels of the carriers for the output signals ("output channels").

The other class of information is the mapping function that specifies the mapping of each input channel to a respective output channel. For each drop filter tuned to a respective input channel, that information will determine the output channel to which the corresponding resonator is tuned. Given a definition of the input and output channels and a sequential ordering of the input channels, the mapping function can be specified, for example, as a permutation of the output channels.

Accordingly, the cross-connect can be reconfigured at two levels. At a higher level, it can be reconfigured by redefining the input and output channels; i.e., by redefining the positions on the frequency spectrum that correspond to the desired input and output channels and retuning the drop filters and/or the resonators accordingly. At a lower level, i.e. in view of a given set of defined input and output channels, the cross-connect can readily be reconfigured by specifying a different permutation of the output channels (or an equivalent operation) and retuning the drop filters or the resonators accordingly.

The detector-modulator element will now be described in greater detail with joint reference to FIGS. 3 and 4, in which corresponding elements are designated by like reference numerals. An exemplary silicon microresonator 300 is shown in the figures as fabricated on a silicon pedestal 305. An electric heater is included as a resistive ring 310 of silicon included between a central, p+ ohmic contact region 315 and a surrounding p+ ohmic ground-contact region 320. Such a resonator structure is well known. The structure and a method for its manufacture are described, for example, in M. Watts, "Ultralow Power Silicon Modulators," *Advanced Photonics for Communications*, OSA Technical Digest (online) (Optical Society of America, 2014), paper JT2B.2, the entirety of which is hereby incorporated herein by reference.

The doping in the microresonator disk (or ring) is preferably as high as is practicable, while maintaining adequate optical quality factor, in order to maximize the built-in voltage.

A germanium photodetector 325 is monolithically integrated with the resonator. An upper layer 330 of the photodetector is an n+ germanium ohmic contact region. In operation, that layer is electrically connected to the positive pole of a voltage source so as to apply a reverse bias between layer 330 and ground-contact region 320. The germanium photodetector, which includes layer 330 and the underlying germanium layer 335, is epitaxially grown on the underlying portion 340 of the silicon pedestal.

Under voltage bias, an electric field extends between the germanium photodetector and the microresonator. The direction of the field is such that when there is photogeneration of electron-hole pairs, a hole current is swept from photodetector 325 into microresonator 300, as indicated in the figure by arrow 345. (Equivalently, the direction of electron flow is opposite to the direction of the arrow.) The resulting change in carrier density causes the effective refractive index in the microresonator to change. This, in turn, shifts the optical resonant frequency of the microresonator.

For at least some implementations, it may be advantageous to add p-type doping to silicon region 340. This treatment can modify the electric field profile so as to make the field more effective in sweeping carriers into pedestal region 305.

In typical implementations, the voltage bias is in the range 14V-25V. At such high biases, the germanium photodetector would typically be operated as an avalanche photodiode. For some applications, however, it will be advantageous to employ a design that operates at CMOS-compatible bias voltages, which are substantially lower. In low-voltage designs, it is desirable to use a longer photodetector to maximize the responsivity. Another option is to curve the photodetector so that it partially wraps the modulator, so as to maximize the current into the modulator.

In the example provided here, the germanium photodetector is doped n-type and the silicon microresonator is doped p-type. A functional device in which these polarities are reversed can also be made. However, the polarities according to the provided example are preferred because epitaxial germanium layers are more readily grown on p-type than on n-type silicon. A further benefit is that the germanium growth on p-type silicon results in fewer dislocations, and the p-type dopants (typically boron) will diffuse partly into the germanium after it is grown, thereby enhancing the dopant continuity.

As noted above, it is desirable to provide a feedback loop for active stabilization of the individual resonator frequencies.

We will now provide one example of a process for fabricating a germanium photodetector on a silicon pedestal. The process is integrated into a CMOS-compatible silicon photonics process flow. The fabrication of a device by a similar process is described in C. DeRose et al., "Ultra compact 45 GHz CMOS compatible Germanium waveguide photodiode with low dark current," *Opt. Express* 19 (2011) 24897-24904, the entirety of which is hereby incorporated herein by reference.

It should be borne in mind, however, that the process described below is purely illustrative, and that many alternatives are known in the art for achieving the same or similar results using different process steps and different temperatures and other process parameters. In particular, it should be understood that the specific growth and deposition steps described here are exemplary and not limiting. It should also be understood that materials alternative to those describe here may be substituted, such as amorphous or polycrystalline germanium and amorphous or polycrystalline silicon.

Figure 3:
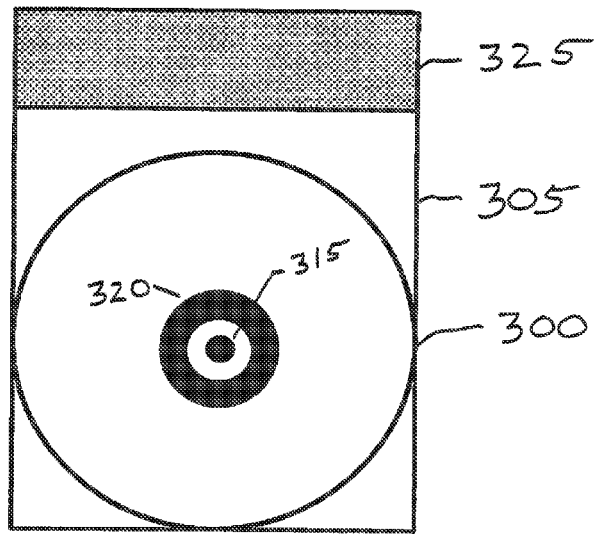
FIG. 3 is a partially schematic top-down plan view of a device in which a photodetector is integrated with an optical microresonator according to an embodiment of the present invention.
Figure 4:
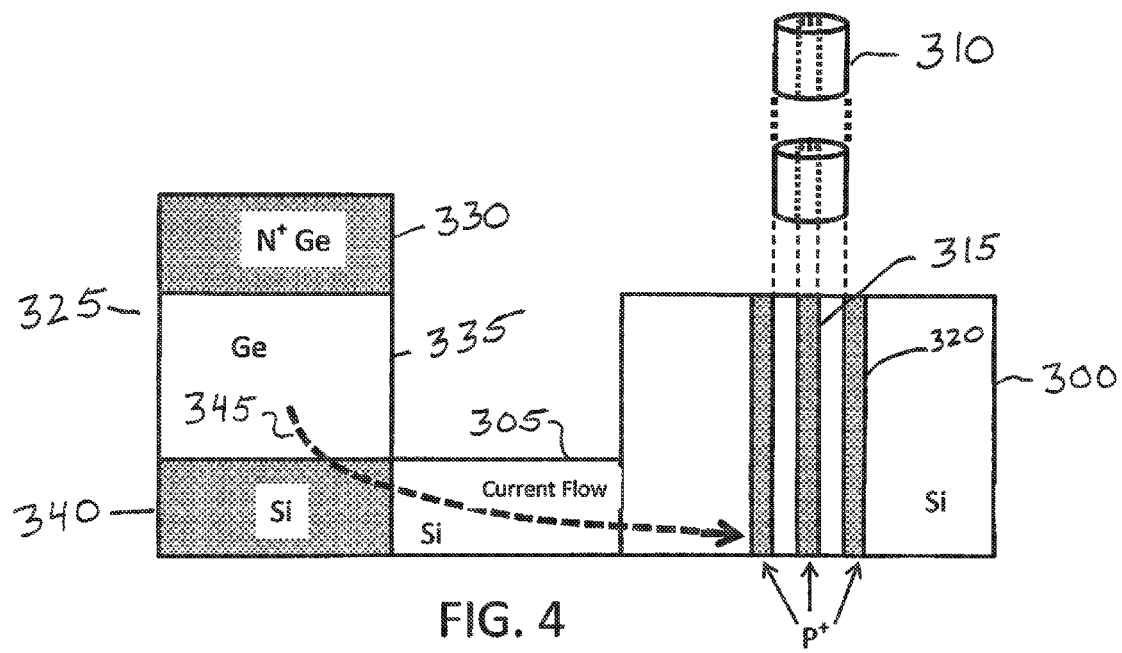
FIG. 4 is a partially schematic elevational side view of the device of FIG. 3, including an exploded view of an electric heating element and a superposed arrow illustrating the direction of electric current flow induced by detected light.

First, a silicon microresonator structure such as that shown in FIGS. 3 and 4 is formed by known silicon photonics fabrication techniques. The structure includes silicon pedestal 305 and silicon microresonator disk 300. As shown in the figures and most easily seen in FIG. 4, pedestal 305 extends (leftward as seen in FIG. 4) away from the microresonator disk and terminates in the silicon pedestal extension portion 340 that will underlie the germanium photodetector body.

In an example, the microresonator disk 300 and its associated waveguides (which are not shown in FIGS. 3 and 4) are approximately 220 nm thick. Pedestal 305 is created using a mask and reactive ion etching, which leaves the disk and waveguides with the full silicon thickness, but reduces the height of the pedestal. The height of the pedestal is not critical, but is generally in the range 25-50 nm. As explained above, the pedestal constitutes the conductive channel electrically connecting the germanium photodetector body to the resonant disk.

The germanium photodetector body 325 is formed by selective area growth within an oxide trench on top of the silicon pedestal extension portion 340. Initially, the silicon (or nitride) waveguides are clad with high-density plasma (HDP) oxide to a thickness of about 1 μm. (This thickness is not critical and can be modified.) Windows in the oxide are then lithographically patterned and opened by etching. The germanium photodetector body is grown within these windows. This technique is advantageous because the resulting germanium body is self-aligned with its desired location on the silicon pedestal.

The growth of the germanium body is by selective epitaxy. A buffer layer is grown at, e.g., a low temperature of about 400° C. and doped in-situ with boron to a carrier concentration of about $10^{18}$ cm$^{-3}$. The buffer layer growth is followed by an additional growth at 600° C. temperature and 10 mTorr pressure to fill and overgrow the oxide windows. Overgrowing the oxide windows makes it possible for us to planarize the structure by chemical-mechanical polish (CMP) so as to remove germanium until it is flush with the top of the oxide layer.

The final germanium thickness is not critical. We obtained good results with a final thickness of 0.6 μm. However, relatively large variations, according to the objectives of the integrating engineer, will be acceptable.

Phosphorus is implanted into the germanium body and activated to a concentration of $10^{19}$ cm$^{-3}$, yielding n-type layer 330 that forms the cathodic contact region for the photodetector. As described below, an ohmic contact is subsequently made to this region. A capping oxide is deposited to complete the formation of a vertical n-i-p germanium diode structure. Rapid thermal anneal (RTA) activation of the implants is done at 630° C. for 30 seconds.

The anodic contact for the n-i-p germanium diode is made to the p+ ohmic ground-contact region 320 situated in the interior of the silicon resonator disk. This contact region is implanted with boron and activated to a concentration of $10^{19}$ cm$^{-3}$ prior to the germanium growth.

The ohmic electrical contacts to the anode and cathode are made with a two-step process: First, Ti/TiN sputter depositions are used to form titanium/silicon and titanium/germanium contacts to all n+ and p+ regions in both materials. Then, vias are filled with tungsten.

As noted above, it is desirable to provide a feedback loop for active stabilization of the individual resonator frequencies.

Various appropriate methods of frequency locking are known in the art. For example, W. Zortman et al., "Bit-Error-Rate Monitoring for Active Wavelength Control of Resonant Modulators," *IEEE Micro* 33 (January 2013) 42-52, the entirety of which is hereby incorporated herein by reference, describes a method for using bit-error-rate measurements to acquire and stabilize the wavelength of an optical resonant modulator to an optical carrier wave.

In another example, J. A. Cox et al., "Control of integrated micro-resonator wavelength via balanced homodyne locking," *Optics Express* 22 (2014) 11279-11289, the entirety of which is hereby incorporated herein by reference, describes a method for actively correcting the resonant frequencies of resonant modulators and filters by way of balanced homodyne locking That technique involves balanced detection of an unbalanced four-port Mach-Zehnder interferometer (MZI). The microresonator is included in one path of the MZI.

As those skilled in the art will understand, waveguides and devices can be fabricated on multiple levels of the die, particularly since optical modes are able to couple vertically as well as horizontally. One advantage of multilevel fabrication is greater device density, which leads to greater information density. If the devices are formed in silicon as, e.g. described here, then an overlying waveguide will typically be formed in silicon nitride.

Referring back to FIG. 1, it will be recalled that the input signals are borne on input waveguide 100, from which they are extracted by drop filters 161, 162, 163, etc. Any of various known designs can be used for the drop filters, including additional optical resonators, Mach-Zehnder arrays, arrayed waveguide gratings (AWGs), and echelle gratings. It should be noted in this regard that AWGs and echelle gratings are not generally tunable. However, they are still useful in the present context because cross-connect functionality can be achieved with fixed input channels, provided the output channels are reconfigurable. Similarly, cross-connect functionality can be achieved with fixed output channels and reconfigurable input channels.

Figure 5:
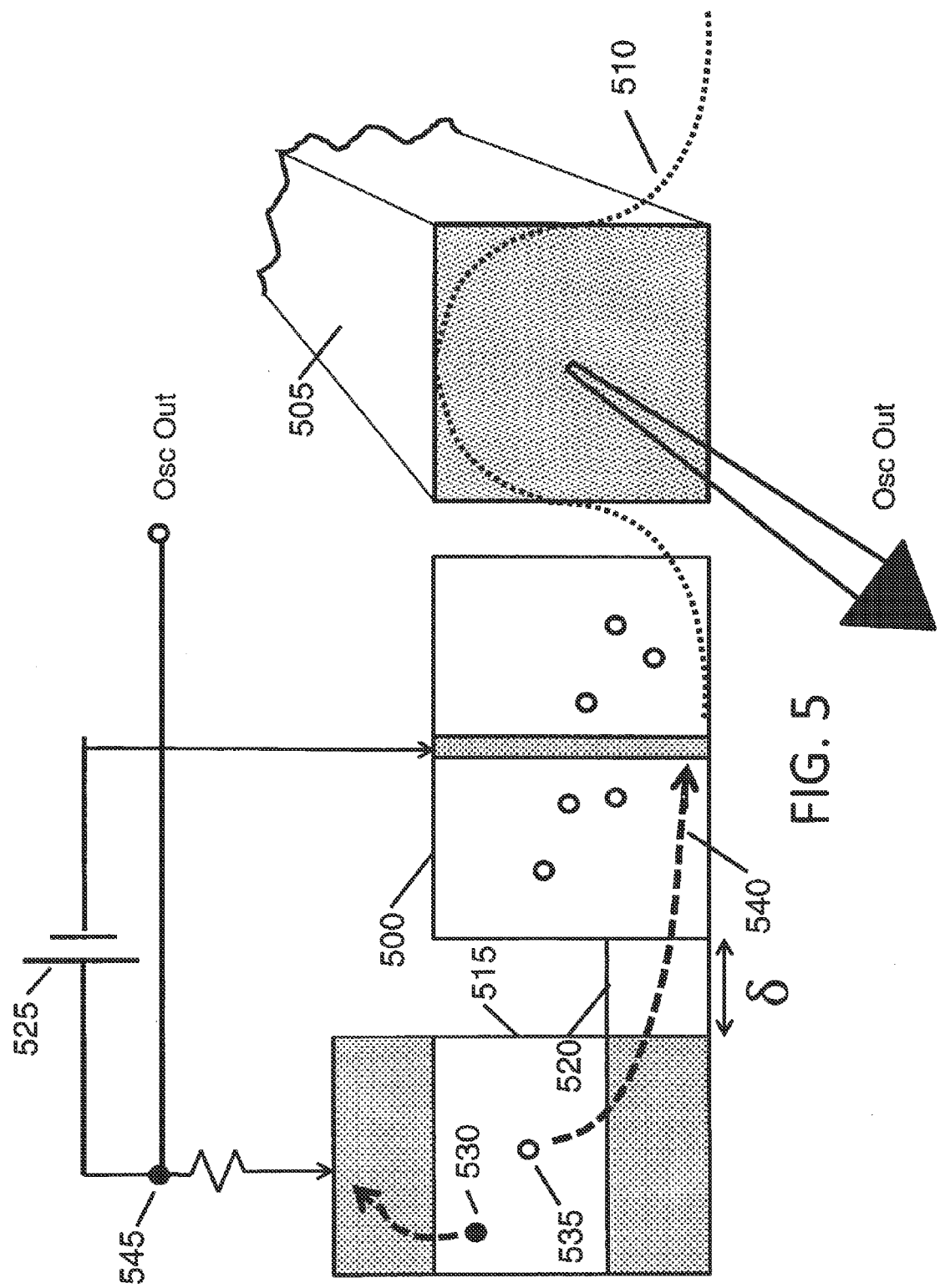
FIG. 5 is a partially schematic elevational side view of an electrical and optical oscillator according to an embodiment of the present invention.

FIG. 5 provides another embodiment of the present invention, in which electrical and optical coupling between the photodetector and the microresonator cause feedback that produces optical and electrical oscillations. Accordingly, the embodiment of FIG. 5 can provide a useful optical and optionally also electrical oscillator.

Turning now to the figure, it will be seen that microresonator 500 is situated closely enough to waveguide 505 to be overlapped by the guided mode field of the waveguide, represented in the figure by electromagnetic field profile 510. Profile 510 is provided as a notional illustration and is not meant to be an accurate representation of the field. However, if profile 510 is understood as a curve representing optical power as a function of transverse position, it is possible to choose the amount of overlap so as to achieve the best tradeoff between power coupling and the optical quality factor of the resonator.

Germanium photodetector 515 is situated relative to the microresonator so as to sense the evanescent optical field of the microresonator without damping the microresonator to such an extent that the quality factor Q is too low for sustained oscillation. Hence there will generally be a separation, represented in the figure by the length 6 of intermediate silicon pedestal portion 520, at which the sensitivity of the detector is optimally balanced against the Q-factor of the resonator.

In operation, the photodetector is strongly biased by voltage source 525. The microresonator is placed in resonance with an optical carrier propagating in waveguide 505. The resonance condition may be reached by tuning the light source that produces the optical carrier or by tuning the microresonator. The microresonator may be tuned using, e.g., a heater as described above. (To simplify the presentation, the heater has been omitted from FIG. 5.)

At resonance, a relatively strong evanescent field stimulates the photogeneration of electron-hole pairs within the germanium photodetector. Under the action of the electrical bias field, electrons 530 and holes 535 are separated and the holes are swept into the microresonator as indicated by arrow 540. Hole current in the microresonator shifts its resonant frequency and thus causes it to go off resonance with the optical carrier. When resonance ceases, the photogeneration of charge carriers likewise ceases. This in turn causes the microresonator to settle back into resonance with the optical carrier, thus initiating a new cycle.

By cycling between an on-resonance condition and an off-resonance condition, the device modulates an oscillating envelope onto the optical carrier. The modulated waveform can be recovered from the same waveguide that delivers the (unmodulated) carrier, or from a second waveguide similarly evanescently coupled to the microresonator.

The same on-off cycling also generates an oscillatory electrical waveform, which can be tapped off for utilization from, e.g., circuit node 545 of the figure.

We believe it likely that the frequency of oscillation can be tuned to some extent by varying the bias voltage, because variation in the electrical field in the detector will cause variations in the charge carrier velocity and therefore variation in the oscillatory response.

We claim:

1. An optical cross-connect apparatus for transferring data from at least one input optical carrier to at least one output optical carrier, comprising:
    a photodetector;
    an optical microresonator monolithically integrated on a common substrate with the photodetector;
    a path electrically connecting the photodetector to the microresonator;
    an arrangement of electrical contacts operable for applying a voltage between the photodetector and the microresonator, wherein the voltage creates an electric field oriented to sweep photogenerated charge carriers from the photodetector into the microresonator upon excitation of the photodetector;
    an input waveguide optically coupled to the photodetector and configured so that in operation it will excite the photodetector with the input optical carrier; and
    an output waveguide optically coupled to the microresonator and configured so that in operation it will transport the output optical carrier at least in a downstream direction away from the microresonator, wherein
    the microresonator is optically coupled to the output waveguide such that at resonance, the output optical carrier does not propagate in the output waveguide in the downstream direction, but away from resonance, the output carrier is able to propagate in the output waveguide in the downstream direction.

2. The apparatus of claim 1, wherein the output waveguide is further configured so that in operation it will transport the output optical carrier to the microresonator from an upstream source.

3. The apparatus of claim 1, comprising a further waveguide configured so that in operation it will transport the output optical carrier to the microresonator from an upstream source.

4. The apparatus of claim 1, configured as an optical cross-connect for transferring data from a plurality of input optical carriers to a plurality of output optical carriers, wherein the said microresonator and photodetector are constituents of one of a plurality of units, each of which likewise comprises a photodetector, an optical microresonator monolithically integrated on a common substrate with the photodetector, a path electrically connecting the photodetector to the microresonator, and an arrangement of electrical contacts operable for applying a voltage between the photodetector and the microresonator; and wherein:
    the input optical waveguide is configured for transporting a plurality of input optical carriers;
    the apparatus further comprises a plurality of drop filters arranged so that each said drop filter optically couples the input optical waveguide to a respective one of the units at least at some optical drop frequencies; and
    the output waveguide is optically coupled to the microresonator in each said unit such that at resonance the output optical carrier does not propagate in the output waveguide in a downstream direction away from the microresonator, but away from resonance the output carrier is able to propagate in the output waveguide in the downstream direction.

5. The apparatus of claim 4, further comprising a tuning element formed within the microresonator in each said unit.

6. The apparatus of claim 5, further comprising a control circuit configured to operate the tuning element so as to tune its respective resonator to selectable optical frequencies.

7. The apparatus of claim 4, wherein the drop filters are tunable and the apparatus further comprises a control circuit for tuning the drop filters to selectable optical drop frequencies.

8. A method for producing a modulated output signal in an output optical waveguide coupled to an optical microresonator such that at resonance, light guided in the microresonator is prevented from propagating in the output optical waveguide in a downstream direction away from the microresonator, comprising:
    exciting an optical resonance in the microresonator with an output optical carrier;
    exciting a photocurrent in a photodetector with an input optical carrier modulated with data, the input optical carrier propagating on an input optical waveguide optically coupled to the photodetector, the photodetector monolithically integrated on a common substrate with the optical microresonator; and
    driving the photocurrent into the microresonator under an electric field created by a voltage applied between the photodetector and the microresonator so as to shift the microresonator off of resonance with the optical carrier, thereby to enable the output optical carrier to propagate in the downstream direction in the output optical waveguide.

9. The method of claim 8, further comprising tuning the microresonator so as to select the output optical carrier and tuning a drop filter so as to select the input optical carrier.

10. The method of claim 9 repeated in each of a plurality of units, wherein each unit is coupled to a respective drop filter and comprises a microresonator coupled to the output optical waveguide, a photodetector, and an electrical path between the microresonator and the photodetector.

11. The method of claim 10, further comprising delivering a plurality of distinct input optical carriers to the drop filters on the input optical waveguide.

12. The method of claim 11, further comprising delivering a plurality of distinct output optical carriers to the microresonators in the respective units on the output optical waveguide.

13. The apparatus of claim 1, wherein the microresonator is fabricated in silicon and the photodetector is fabricated in germanium.

14. The apparatus of claim 13, wherein a silicon pedestal underlies the photodetector and provides the path electrically connecting the photodetector to the microresonator.

15. The apparatus of claim 14, wherein the arrangement of electrical contacts comprises a metal element in ohmic contact with a highly doped upper layer of the germanium photodetector having a predominant carrier type that is one of p-type and n-type, and a metal element in ohmic contact with a highly doped portion in the interior of the silicon microresonator having the other predominant carrier type.

* * * * *